(12) United States Patent
Qiao (10) Patent No.: US 10,274,689 B2
(45) Date of Patent: Apr. 30, 2019

(54) REGROUP OPTICAL CABLE (71) Applicant: Lijie Qiao, Ottawa (CA)

(72) Inventor: Lijie Qiao, Ottawa (CA)

(*) Notice: Subject to any disclaimer, the term of this patent is extended or adjusted under 35 U.S.C. 154(b) by 1 day.

(21) Appl. No.: 15/494,598

(22) Filed: Apr. 24, 2017

(65) Prior Publication Data
US 2018/0052294 A1  Feb. 22, 2018

Related U.S. Application Data (60) Provisional application No. 62/377,038, filed on Aug. 19, 2016.

(51) Int. Cl.
*G02B 6/44* (2006.01)
*G02B 6/36* (2006.01)
*G02B 6/38* (2006.01)

(52) U.S. Cl.
CPC ......... *G02B 6/4439* (2013.01); *G02B 6/3668* (2013.01); *G02B 6/3672* (2013.01); *G02B 6/4471* (2013.01); *G02B 6/3885* (2013.01); *G02B 6/3893* (2013.01)

(58) Field of Classification Search
CPC .. G02B 6/4439; G02B 6/3668; G02B 6/3672; G02B 6/4471; G02B 6/3885; G02B 6/3893
USPC .......................................................... 385/109
See application file for complete search history.

(56) References Cited

U.S. PATENT DOCUMENTS

| | | | |
|---|---|---|---|
| 2003/0031452 A1* | 2/2003 | Simmons | G02B 6/3668 385/147 |
| 2005/0084200 A1* | 4/2005 | Meis | G02B 6/3608 385/14 |
| 2008/0002936 A1* | 1/2008 | Sun | G02B 6/3608 385/114 |

* cited by examiner

*Primary Examiner* — Jerry M Blevins
(74) *Attorney, Agent, or Firm* — Teitelbaum Bouevitch & McLachlen; Neil Teitelbaum (57) ABSTRACT

An optical regroup cable is provided for a fixed optical cross connect. The cable may include holders for supporting the fibers within the cable and to group the fibers into two bundles. The bundles are arranged so that relative positions of two bundle ends at a first end of the cable are different from relative positions of two bundle ends at a second end of the cable.

10 Claims, 5 Drawing Sheets

REGROUP OPTICAL CABLE

CROSS-REFERENCE TO RELATED APPLICATIONS

The present application claims priority from U.S. Patent Application No. 62/377,038 filed Aug. 19, 2016, which is incorporated herein by reference for all purposes.

TECHNICAL FIELD

The present disclosure relates generally to optical cables and, more particularly, to regroup cables and methods for making thereof.

BACKGROUND OF THE INVENTION

The modern telecommunication systems often include optical fiber networks, and that requires a variety of equipment, including devices for multiplexing, demultiplexing, and switching of optical signals. The switching may be implemented in the electronic domain; however, the electronic circuits limit the maximum bandwidth of the signal. It is desirable to use transparent, all-optical devices.

Figure 1:
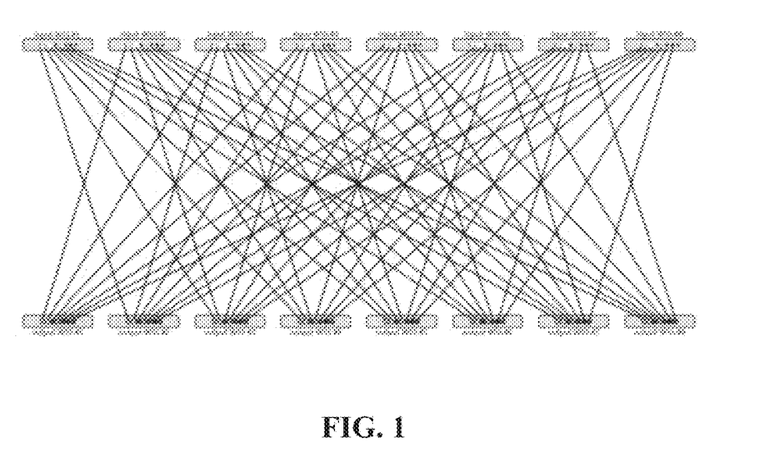
FIG. 1 illustrates cross connection among 8 switching components.
Figure 2:
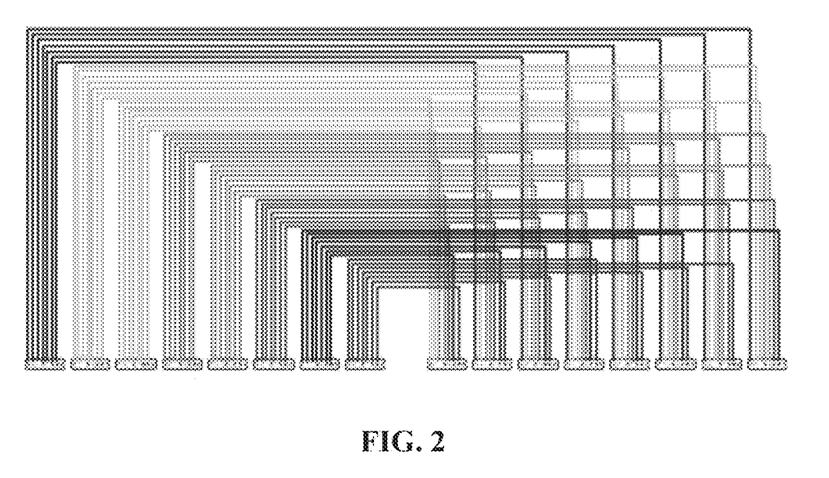
FIG. 2 illustrates a conventional regroup fiber plate.

One particular problem associated with optical switching is a convenient and inexpensive device enabling fixed optical cross connect, for connection of several devices so that each of the devices receives input from all other devices, though not from itself. By way of example, such connectors may be used with switching arrays that switch signals between optical fibers on the per-wavelength basis. FIG. 1 illustrates the complexity of connections between 8 devices, and FIG. 2—a conventional regroup fiber plate that enables the connections presented in FIG. 1. However, the fiber plates have a relatively large size. The complexity often leads to human errors in the placement of fibers in this complex configuration. Furthermore, the brittleness of the fibers affects the design solutions, and fibers may break if routed and bended by a machine.

Accordingly, there is a need for an optical device that enables fixed optical cross connect and may be used for connection of several devices so that each of the devices receives input from all other devices, though not from itself.

SUMMARY OF THE INVENTION

The disclosure relates to a regroup cable that has first and second cable ends and includes: a support structure disposed between the first and second cable ends, and a plurality of $N(N-1)$ fibers supported by the support structure in fixed relative positions, wherein the plurality of fibers form N rows including $(N-1)$ fibers in each row at the first cable end, and form N columns including $(N-1)$ fibers in each row at the second cable end, wherein the plurality of fibers are arranged so as to form first and second bundles of fibers, wherein the first bundle is proximate to the second bundle so that no other fiber from the plurality of $N(N-1)$ fibers is disposed between the first and second bundles, wherein a relative position of an end of the first bundle with respect to an end of the second bundle at the first cable end is different from a relative position of an end of the first bundle with respect to an end of the second bundle at the second cable end, wherein each of the N columns at the second cable end receives fibers extending from N−1 rows of fibers at the first cable end, and wherein for any two of the N columns there is a particular row at the first cable end such that one column receives a fiber from said row and another column receives no fibers from said row.

Another aspect of the disclosure relates to a regroup cable that has a first end and a second end and includes: a first support and a second support spaced apart from the first support, wherein the second support is disposed between the first support and the second end of the cable, a plurality of fibers supported by the first and second supports in fixed relative positions, wherein the plurality of fibers form N rows in the first support, wherein each of the N rows includes $(N-1)$ positions of fibers extending from said row, wherein the plurality of fibers form N columns in the second support, wherein each of the N columns includes $(N-1)$ positions of fibers extending to each of the N columns, wherein relative positions of each of the plurality of fibers are fixed within each of the first and second supports; wherein each intermediate row ($i=2, \ldots N-2$) in an $(N-1) \times N$ matrix associated with the second support is associated with positions of one or more fibers extending to the second support from a corresponding row (i) of the first support and one or more fibers extending to the second support from a previous row (i−1) or a next row (i+1) of the first support, wherein the $(N-1) \times N$ matrix is such that the N columns formed by fiber positions in the second support are one-to-one associated with N columns of the $(N-1) \times N$ matrix, fibers extending from a top row of the first support extend to positions associated with a 1st row of the $(N-1) \times N$ matrix and fibers extending from a bottom row of the first support extend to positions associated with an $(N-1)$-th row in the $(N-1) \times N$ matrix; and, wherein each of the N columns in the second support receives fibers extending from N−1 rows of the first support, and wherein for any two of the N columns there is a particular row in the first support such that one column receives a fiber from said row and another column receives no fibers from said row.

Yet another aspect of the disclosure relates to a method of forming a regroup cable. The method includes: providing first, second, third and fourth holders, wherein each holder includes two major surfaces, a side surface therebetween, and a plurality of apertures extending through said holder between the major surfaces, and the plurality of apertures are arranged in a triangle; forming two bundles of fibers, including: inserting a first plurality of fibers through the pluralities of the apertures of the first and second holders, wherein each of said fibers extends through one of the plurality of apertures in the first holder and through one of the plurality of apertures in the second holder, spacing apart the first and second holders by relatively moving the first and second holders so as create space therebetween, wherein said fibers stay inserted in the first and second holders, inserting a second plurality of fibers through the pluralities of the apertures of third and fourth holders, wherein each of said fibers extends through one of the plurality of apertures in the third holder and through one of the plurality of apertures in the fourth holder, and spacing apart the third and fourth holders by relatively moving the third and fourth holders so as create space therebetween, wherein said fibers stay inserted in the third and fourth holders; combining the two bundles of fibers, including: relatively moving the first and third holders so as to make a side surface of the first holder proximate to a side surface of the third holder, wherein the triangles formed in the first and third holders are proximate by their neighboring sides, and relatively moving the second and forth holders so as to make a side surface of the second holder proximate to a side surface of the fourth holder, wherein the triangles formed in the second and fourth holders are proximate by their sides, wherein a relative position of the neighboring side in the first holder along the neighboring side in the third holder is different from a relative position of the neighboring side in the second holder along the neighboring side in the fourth holder.

BRIEF DESCRIPTION OF THE DRAWINGS

The invention will be described in greater detail with reference to the accompanying drawings which represent preferred embodiments thereof, wherein.

DETAILED DESCRIPTION

An optical cable may be used for interconnecting N devices so that each device receives input from all other devices, though not from itself. The cable is a regroup cable because it regroups the fibers between N connectors at the first end of the cable and N other connectors at the second end of the cable.

Figure 3:
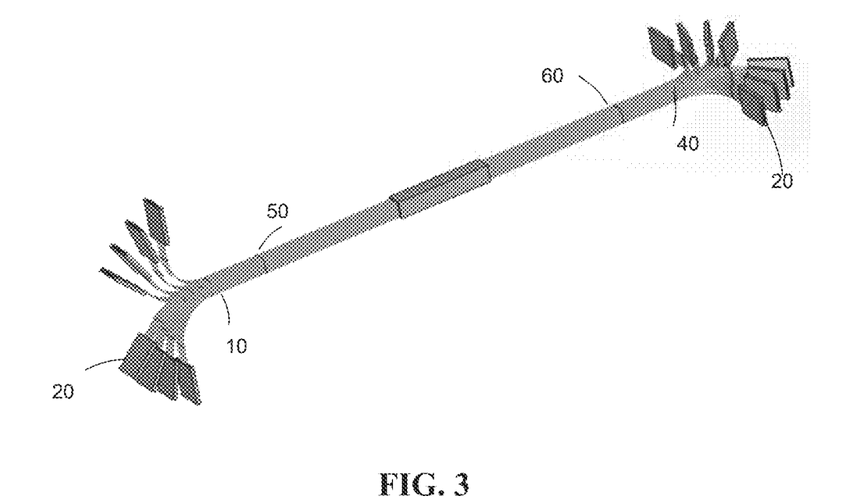
FIG. 3 is a schematic drawing of a regroup cable.
Figure 4:
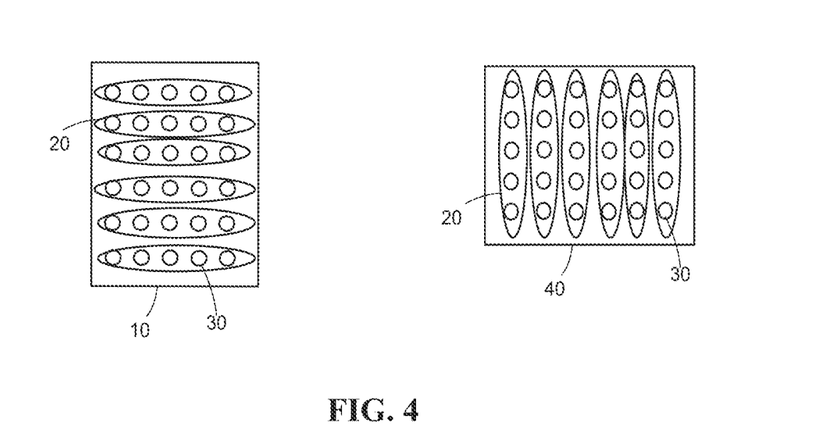
FIG. 4 shows relative positions of the fibers at cable ends.

With reference to FIGS. 3 and 4, the cable has two ends 10 and 40. Each of the cable ends may have N connectors 20 attached, each connector for receiving (N−1) optical fibers 30. In the drawing N=6 for illustrative purposes only and is not limiting; the same relates to other drawings as well. The connectors 20 at the cable end 10 are shown disposed horizontally relative to the drawing. At the other end 40, connectors 20 are shown in vertical positions.

The regroup cable enables the fixed cross connect so that each particular connector disposed at the end 40 receives (N−1) fibers from (N−1) different connectors at the end 10 of the cable and vice versa. By way of example, the last connector at the cable end 40 (the rightmost connector in FIG. 4) may receive fibers from the first (N−1) connectors at the cable end 10 and receive no fibers from the last (bottom in FIG. 4) connector at the end 10.

The regroup cable includes N(N−1) fibers for cross-connecting N devices. The N(N−1) fibers may be supported by a support structure disposed between the first and second cable ends. The fibers are supported in fixed positions relative to each other. With reference to FIG. 3, the support structure may include two supports: a first support 50 and a second support 60 spaced apart from the first support. The first support 50 is proximate to or directly at the first end 10 of the cable, and the second support 60 is proximate to or directly at the second end 40 of the cable. For certainty, the first support 50 is disposed between the first cable end 10 and the second support 60, whereas the second support 60 is disposed between the first support 50 and the second cable end. Relative positions of the N(N−1) fibers are fixed within each of the supports.

At the first cable end, the N(N−1) fibers form N rows with (N−1) fibers in each row, wherein each row of fibers may be connected to one of the connectors 20. At the second cable end, the N(N−1) fibers form N columns with (N−1) fibers in each column, wherein each column of fibers may be connected to one of the connectors 20. The connectors themselves are not necessarily attached to the cable when and where the cable is manufactured; the connectors may be attached to the cable later and at a different location.

In one embodiment, the fibers are arranged so as to form relatively straight rows and columns at each of the cable ends. The fibers 30 in FIG. 4 may be seen as forming two matrices, a 6×5 matrix at the first end 10 and a 5×6 matrix at the second end 40. However, one row of fibers may be misaligned relative to another row of fibers at the first cable end, and one column of fibers may be misaligned relative to another column of fibers at the second cable end. Then, fiber positions at a cable end may be represented by a matrix wherein each position in the matrix corresponds to a fiber position at the cable end if the connectors were aligned at that cable end.

An N×(N−1) matrix may be associated with cable positions in a cross section of the cable at the first cable end, wherein each of the N rows of the matrix is associated with one of the N rows of fibers and/or with one of the connectors at the first end of the cable. Another matrix, of (N−1)×N dimension, may be associated with cable positions in a cross section of the cable at the second cable end, wherein each of the N columns of the matrix may be associated with one of the columns of fiber positions at the second end and/or with one of the N connectors at the second end of the cable. The N(N−1) fibers may be arranged in groups, wherein each group stays together, and shifts together if necessary, as a bundle, possibly with fibers parallel to each other within the group. The N(N−1) fibers may include at least two bundles of fibers, wherein the bundles are distinct from one another and proximate to each other.

The first bundle is proximate or adjacent to the second bundle in the sense that no other fiber from the plurality of N(N−1) fibers is disposed between the first and second bundles anywhere between the first and the second ends of the cable. Other materials, such as the supporting structure or fiber insulation may be present between the first and second bundles, though there are no additional fibers forming the N(N−1) cross connect.

The bundles are distinct so that they shift relatively to each other while extending between the first and second ends of the cable. In other words, a relative position of an end of the first bundle with respect to an end of the second bundle at the first cable end is different from a relative position of an end of the first bundle with respect to an end of the second bundle at the second cable end. Preferably, the fibers are parallel within each bundle, though fibers of the first bundle are not parallel to the fibers of the second bundle.

Figure 5:
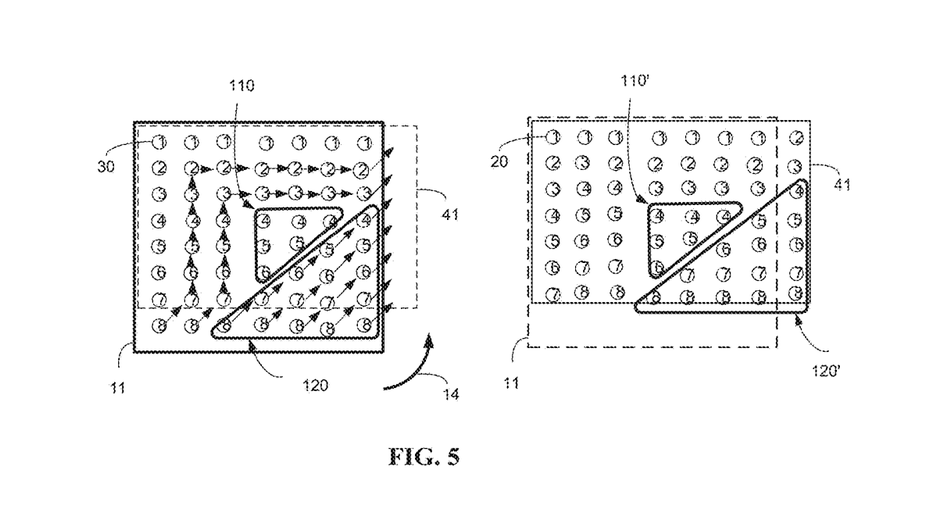
FIG. 5 illustrates an embodiment of a regroup cable.
Figure 6:
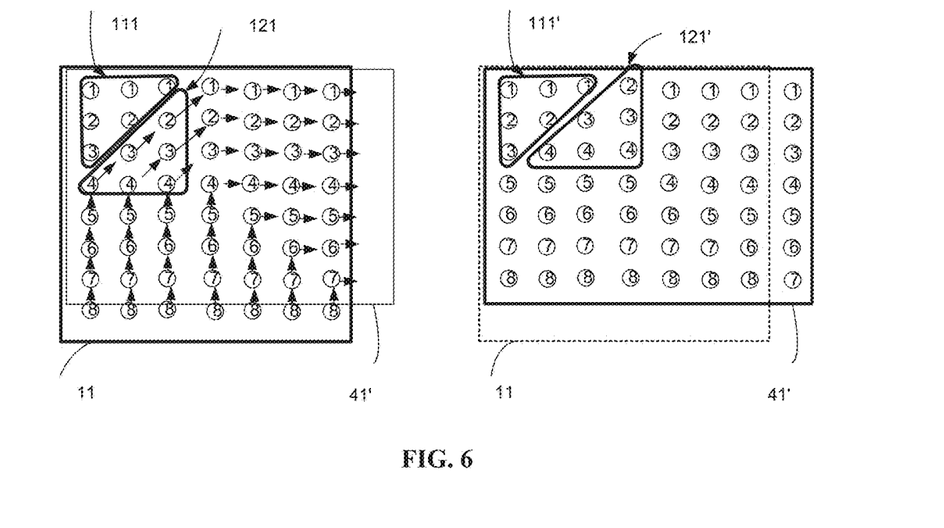
FIG. 6 illustrates an embodiment of a regroup cable.
Figure 7:
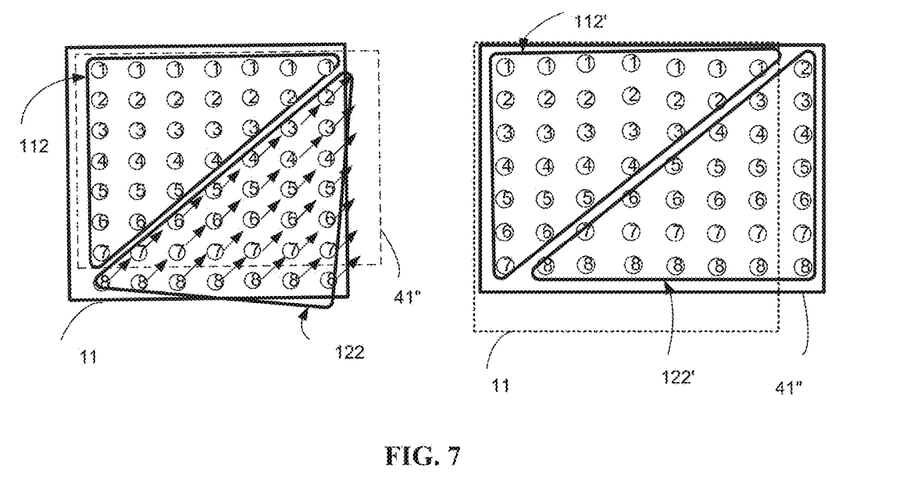
FIG. 7 illustrates an embodiment of a regroup cable.

By way of example, FIGS. 5-7 illustrate different arrangements of fibers within the regroup cable.

With reference to FIG. 5, the N×(N−1) matrix 11 represents the positions of fibers at the first cable end, and the (N−1)×N matrix 41—at the second cable end. Each fiber has a fixed position relative to other fibers at each of the ends 10 and 40. Therefore, there is a one-to-one relationship between a fiber position within the N×(N−1) matrix 11 and a position in the (N−1)×N matrix 41, the relation is that the two positions are associated with a same fiber. Small arrows indicate how fibers 30 change their relative positions while extending from the first cable end (on the left of the drawing) to the second cable end (on the right of the drawing). The plurality of fibers include two bundles proximate to one another. The first bundle has ends 110 and 110' at the first and second ends of the cable, respectively. The second bundle has ends 120 and 120' at the first and second ends of the cable, respectively. Relative to the first bundle 110&110', the second bundle shifts from the position 120 at the first cable end to the position 120' at the second cable end.

FIG. 6 illustrates another embodiment of the regroup cable. The N×(N−1) matrix 11 again represents the positions of fibers at the first cable end, and the (N−1)×N matrix 41'—at the second cable end. However, the N(N−1) fibers extending from the first cable end are regrouped differently on their path to the second cable end, therefore the arrangement of fibers is different from the embodiment illustrated in FIG. 5, and the matrix 41' is different from the matrix 41 (FIG. 5). The plurality of fibers include two bundles proximate to one another. The first bundle has ends 111 and 111' at the first and second ends of the cable, respectively, and the second bundle has ends 121 and 121' at the first and second ends of the cable, respectively. Relative to the first bundle 111&111', the second bundle shifts from the position 121 at the first cable end to the position 121' at the second cable end.

FIG. 7 illustrates yet another embodiment of the regroup cable. The N×(N−1) matrix 11 again represents the positions of fibers at the first cable end, and the (N−1)×N matrix 41"—at the second cable end. The first bundle has ends 112 and 112' at the first and second ends of the cable, respectively, and the second bundle has ends 122 and 122' at the first and second ends of the cable, respectively. Relative to the first bundle 112&112', the second bundle shifts from the position 122 at the first cable end to the position 122' at the second cable end. Each bundle has a triangular arrangement of fibers in a cross section. The two bundles together form the N(N−1) fibers that enable the fixed cross connect. The bundles are distinct from one another, adjacent to each other, and shift relatively to each other while extending between the first and second ends of the cable. A relative position of an end of the first bundle with respect to an end of the second bundle at the first cable end is different from a relative position of an end of the first bundle with respect to an end of the second bundle at the second cable end.

In addition to the embodiments illustrated in FIGS. 5-7, there are other embodiments wherein two adjacent bundles of fibers shift relative to each other as described above so as to pivotally regroup the plurality of fibers between the two ends of the cable. Of course, the value of N(=8) in the drawings is for illustrative purposes only. It is practical to have 4≤N≤49, more preferably 9≤N≤25.

Two adjacent bundles of fibers that shift relative one another or slightly twist in the direction one around another, serve as a pivot in rearranging the fibers, from the N rows at the first cable end to the N columns at the second cable end. Compared to an all-parallel arrangement of all fibers between two cable ends, the relative movement of the fiber bundles causes other fibers to shift or stay in place, e.g. by taking their positions at a second cable end. Consequently, the entire set of fibers slightly twists around the set's axis in the direction indicated by the arrow 14 (FIG. 5). The rearrangement of fibers enables the fixed cross connect feature: each of the N columns at the second cable end receives fibers extending from N−1 rows of fibers at the first cable end, wherein for any two of the N columns there is a particular row at the first cable end, such that one column receives a fiber from said row and another column receives no fibers from said row. With reference to FIG. 4, two different connectors at the end 40 receive fibers from different sets of connectors at the first end 10. Preferably, fiber positions in each bundle has a triangular cross section, at least in the matrixes at the cable ends, and the bundles slide relative to one another along the neighboring sides of the triangles (the hypotenuse in the matrix). In one embodiment, the bundles have triangular cross-sections.

Figure 8:
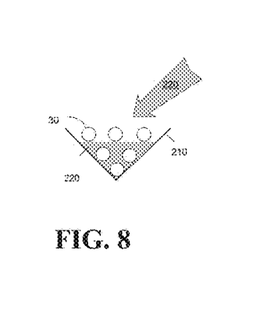
FIG. 8 is a schematic representation of a step in cable manufacturing.

The arrangement of the fibers is supported by the support structure. In one embodiment, the support structure is formed of resin that may be added gradually after a next portion of fibers is arranged in a predefined order. In another embodiment, the two bundles of fibers may be formed within blocks as illustrated in FIG. 8, wherein fibers 30 are placed into an angular support 210 while resin 220 is added onto the fibers. Several blocks with fibers therein may be combined together. The cross-sections of the blocks may be identified based on the two matrixes such as shown in FIGS. 5-7, and fibers within each block may be parallel to each other.

In one embodiment, the support structure may include two supports as disclosed above with reference to FIG. 3. The N(N−1) fibers may be secured within the supports so that the relative positions of each fiber are fixed within each of the supports, wherein the first support supports the plurality of N(N−1) fibers arranged in the N rows with (N−1) fibers in each row, and the second support supports the plurality of N(N−1) fibers arranged in the N columns with (N−1) fibers in each column.

The first and/or second support may include a plurality of apertures, and the plurality of fibers may be inserted through the apertures in a predetermined arrangement so as to form the two bundles of fibers. The apertures may be arranged in a rectangular matrix. The arrangement of fibers within the cable may be defined by the relative positions of the fibers in the first and second supports. The N×(N−1) and (N−1)×N matrices discussed above may be associated with the first and second supports.

Figure 9:
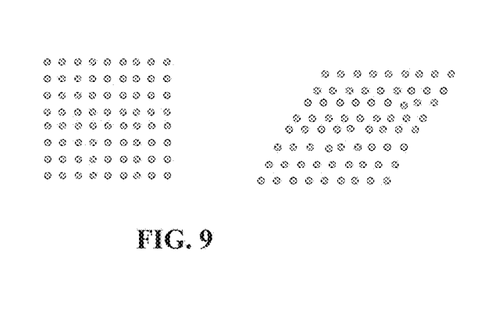
FIG. 9 illustrates possible arrangements of fibers at a support.

Each of the supports may be an integral unit. With reference to FIG. 9, each support may have a rectangular arrangement of fibers extending therethrough. If the rows of fibers in the first support (or columns in the second support) are slightly shifted relative one another, the fiber positions may form a parallelogram, or another figure, still represented by the N×(N−1) matrix as discussed above.

The first and/or second support may contain more than one separate sections also referred herein as holders. Each of the sections may hold a group of fibers in fixed positions relative to other fibers of the same group.

In one embodiment, the support structure includes two supports at two ends of the cable, respectively. Each support includes two sections (holders). Each holder has a triangular arrangement of fiber positions, at least within the matrix associated with the support. The first bundle of fibers extends from one of the two sections of the first support, and extends through the cable to one of the two sections of the second support. The second bundle of fibers extends from another of the two sections of the first support to another of the two sections of the second support.

Each of the two bundles within the cable may have a triangular arrangement of fibers in a cross section. In one embodiment, the triangular arrangement of fibers in the first bundle forms a first triangle of fiber positions at the first cable end and a second triangle of fiber positions at the second cable end, and the triangular arrangement of fibers in the second bundle forms a third triangle of fiber positions at the first cable end and a fourth triangle of fiber positions at the second cable end. The first bundle is proximate to the second bundle so that a side of the first triangle is proximate to a side of the third triangle, and a side of the second triangle is proximate to a side of the forth triangle, thus making two neighboring sides at the first cable end and two neighboring sides at the second cable end. The position of the neighboring side of the first triangle relative to the neighboring side of the third triangle is different from the position of the neighboring side of the second triangle relative to the neighboring side of the fourth triangle. In the terms of matrices, the hypotenuse of triangle 110 is disposed along the hypotenuse of the triangle 120, differently from the position of the hypotenuse of the triangle 110' along the hypotenuse of the triangle 120'. In other words, when the first bundle of fibers slightly twists relative to the second bundle, the fibers form triangles in a cross section of the cable, the triangles are proximate to each other by their neighboring sides (hypotenuses) and slide against each other along the neighboring sides (hypotenuses in the matrices).

The two bundles may include all the N(N−1) fibers necessary for providing the fixed cross connect. When each of the bundles is supported by two holders with triangular arrangement of fibers secured in each holder, the fibers are preferably arranged in triangles with (N−1) fiber positions along each of two sides of the triangle. The holders themselves may have a triangular shape each, possibly the same shape for all the holders.

In the embodiment where the cable includes a plurality of N(N−1) fibers supported by the first and second supports in fixed relative positions, the arrangement of fibers within the cable may be described in terms of the N×(N−1) and (N−1)×N matrices associated with the two supports. The plurality of fibers form N rows in the first support, wherein each of the N rows includes (N−1) positions of fibers extending from said row. The plurality of fibers form N columns in the second support, wherein each of the N columns includes (N−1) positions of fibers extending to each of the N columns. Relative positions of each of the plurality of fibers are fixed within each of the first and second supports. Each intermediate row (i=2, . . . N−2) in the (N−1)×N matrix associated with the second support is associated with positions of one or more fibers extending to the second support from a corresponding row (i) of the first support and one or more fibers extending to the second support from a previous row (i−1) or a next row (i+1) of the first support. The (N−1)×N matrix is such that the N columns formed by fiber positions in the second support are one-to-one associated with N columns of the (N−1)×N matrix, fibers extending from a top row of the first support extend to positions associated with a 1st row of the (N−1)×N matrix, and fibers extending from a bottom row of the first support extend to positions associated with an (N−1)-th row in the (N−1)×N matrix. Fiber positions within the two matrices are paired by fibers extending between two cable ends (or between the two supports). The two matrixes are illustrated in FIGS. 5-7.

The cable enables the fixed cross connect wherein each of the N columns in the second support receives fibers extending from N−1 rows of the first support. For any two of the N columns there is a particular row in the first support, such that one column receives a fiber from said row and another column receives no fibers from said row.

Preferably, each of the plurality of fibers, when extending between the first support and the second support, shifts laterally (in a cross section of the cable) no more than to an adjacent row and an adjacent position within a row with respect to the N×(N−1) matrix associated with the first support and the (N−1)×N matrix associated with the second support. In other words, a fiber associated with a (i,j) position in one matrix, preferably does not shift further than to (i±1, j±1) in another matrix when the fiber extends from one support to another. Limiting the shift of each particular fiber results in a lesser bend of the fibers and lesser possibility of fiber breakage.

The two bundles of fibers form triangles of fiber positions at the first and second supports, wherein sides of two triangles at the first support are adjacent or proximate to one another, and sides of two triangles at the second support are adjacent to one another, thus forming two pairs of neighboring sides. However, relative positions of the two adjacent sides are different between the first and second supports. In other words, one triangles shifts relative to another triangle as the bundles extend from one support to another. The triangles shift along the line separating the two triangles in a same cross section, while the neighboring sides of the triangles are adjacent to the line.

In one embodiment, fibers shifted when extending between the first support and the second support form a triangle at the second support, wherein each row (i=1, . . . N−1) of the (N−1)×N matrix associated with the second support receives (N−1−i) fibers from the corresponding row (i) of the first support and i fibers from the next row (i+1) of the first support. FIG. 7 illustrates this embodiment, though is not limiting.

Preferably, each connector 20 for receiving (N−1) fibers is implemented in a 1×(N−1) connector, wherein fiber ports or holes are disposed in a line. By way of example, the connectors may be multi fiber termination (MTP) connectors or multi fiber push on (MPO) connectors. In one embodiment, the (N−1) ports forming a row or a column 20 and discussed above as coupled with a single connector, may be grouped into two or more connectors. At one end of the cable, say end 10, the two or more connectors together providing the (N−1) fiber ports may be connected to a single device the same way as the connector 20 having (N−1) fiber ports.

The regroup cable may include a conventional outer coating or cladding, as well as additional fibers that don't participate in providing the cross connect.

In one embodiment, each of the two supports includes two sections (holders) with a triangular arrangement of fibers therein. Manufacturing of the cable may include the following steps: providing two pairs of holders, forming one bundle of fibers by inserting fibers through apertures of the first and second holders, same for the second bundle, and rearranging the holders while the fibers are still inserted therein.

Figure 10:
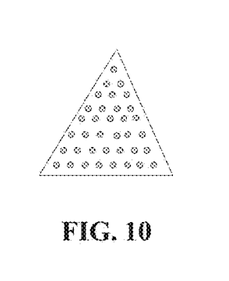
FIGS. 10-12 are schematic representations of holders.
Figure 11:
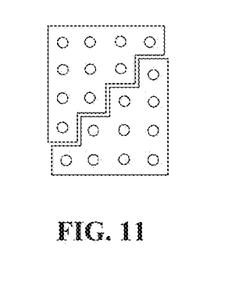
Figure 12:
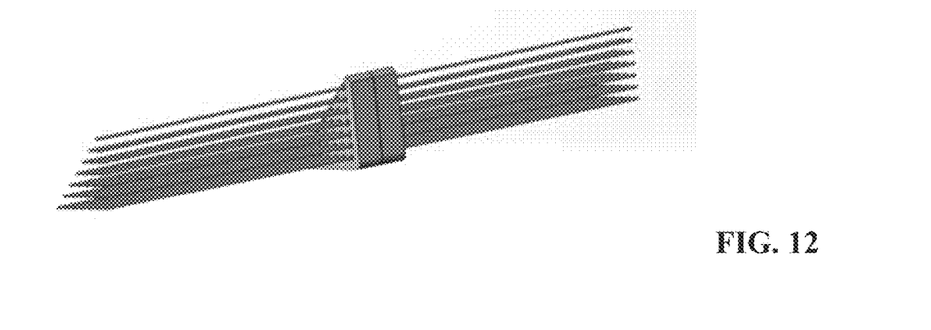

Each of the four holders includes two major surfaces and a side surface therebetween. The side surface may be a relatively narrow ribbon between the two major surfaces, or an edge if the major surfaces contact each other, or a combination of ribbon and edge pieces. The two major surfaces may be substantially planar and substantially parallel to each other, though not necessarily. Each holder includes a plurality of apertures extending through said holder between the major surfaces. The apertures are holes, each sufficient for holding a fiber. The plurality of apertures in one holder are arranged in a triangle. Preferably, each plurality has N(N−1)/2 apertures arranged in (N−1) rows with 1, 2, . . . (N−1) apertures in each row. FIGS. 10-12 illustrate major surfaces of a holder with a triangular arrangement of apertures.

As illustrated in FIG. 12, two holders, for certainty the first and second holder, are arranged so that a major surface of the first holder is preferably proximate to a major surface of the second holder, though not necessarily very close. Each aperture of the first holder is aligned with an aperture of the second holder. N(N−1)/2 fibers are inserted through the apertures of the first and second holders, wherein each of said fibers extends through an aperture in the first holder and through an apertures in the second holder. Then, the first and second holders are spaced apart by relatively moving the first and second holders so as create space therebetween, wherein said fibers stay inserted in the first and second holders. The first and second holders are moved towards the first and second ends of the cable, respectively.

Similarly, another set of N(N−1)/2 fibers are inserted through the apertures of the third and fourth holders, wherein each of said fibers extends through an aperture in the third holder and through an apertures in the fourth holder. Then, the third and fourth holders are spaced apart by relatively moving the third and fourth holders so as create space therebetween, wherein said fibers stay inserted in the third and fourth holders. The third and fourth holders are moved towards the first and second ends of the cable, respectively.

Then, the two bundles of fibers are combined. At least one of the first and third holders is moved, so as to make a side surface of the first holder proximate to a side surface of the third holder, wherein the triangles formed by apertures in the first and third holders are proximate by their neighboring sides. Notably, the fibers stay inserted in the holders. Therefore, the holders can move only along the fibers. The same step is performed for another pair of holders. The second and forth holders are relatively moved so as to make a side surface of the second holder proximate to a side surface of the fourth holder, wherein the triangles formed in the second and fourth holders are proximate by their sides. With reference to FIG. 11, the two holders have their major surfaces in the plane of the drawing; each has a triangle with 10 apertures; the neighboring sides of the triangles are hypotenuses; and the holders are proximate by their zig-zag sides.

Figure 13:
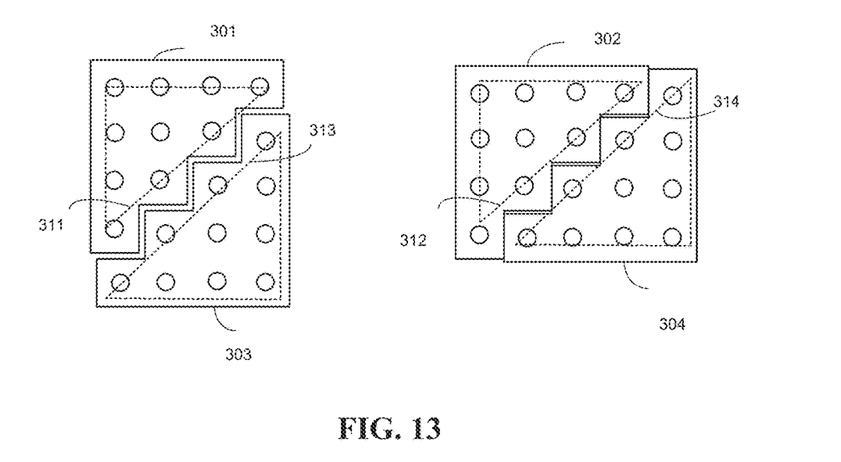
FIG. 13 illustrates relative positions of the holders.

In order to twist one bundle around the other bundle as discussed above, one pair of holders is combined differently from another pair of holders: a relative position of the neighboring side of the triangle in the first holder along the neighboring side of the triangle in the third holder is different from a relative position of the neighboring side of the triangle in the second holder along the neighboring side of the triangle in the fourth holder. With reference to FIG. 13, four holders 301-304 have fibers (not shown) inserted as discussed above, into holders 301 and 302, and holders 303 and 304. Then the bundles are combined, the holders 301 and 303 are made proximate, and the holders 302 and 304 are made proximate as well. A neighboring side 311 of the triangle in the first holder 301 is proximate to a neighboring side 313 of the triangle in the third holder 313. A neighboring side 312 of the triangle in the second holder 302 is proximate to a neighboring side 314 of the triangle in the fourth holder 314. The relative position of the first neighboring side 311 along the third neighboring side 313 is different from the relative position of the second neighboring side 312 along the fourth neighboring side 314. Indeed, the side 311 is shifted north-east along the side 313, whereas the side 312 is shifted south-west along the side 314.

Preferably, the triangular arrangement of fibers is the same in each pair of holders: between the first and second holders, and between the third and fourth holders, so as to make easier the insertion of fibers. That will also make fibers within each bundle parallel to each other. It may also be convenient to have all four holders of the same shape and size with the same triangular arrangement of the apertures, for easy handling during the manufacturing process. The holders may have a substantially triangular shape as illustrated in FIGS. 10-12.

In order to enable the fixed cross connect among N fibers, each of the four holders includes N(N−1)/2 apertures for accepting N(N−1)/2 fibers that form one of the two bundles of the cable. Within each holder, the apertures are preferably arranged in rows along two sides of the triangle, so as to finally form rows of fibers at one end of the cable, and columns—at the other end of the cable. Connectors may be attached to those rows and columns of fibers, immediately, or later and at a different location.

Figure 14:
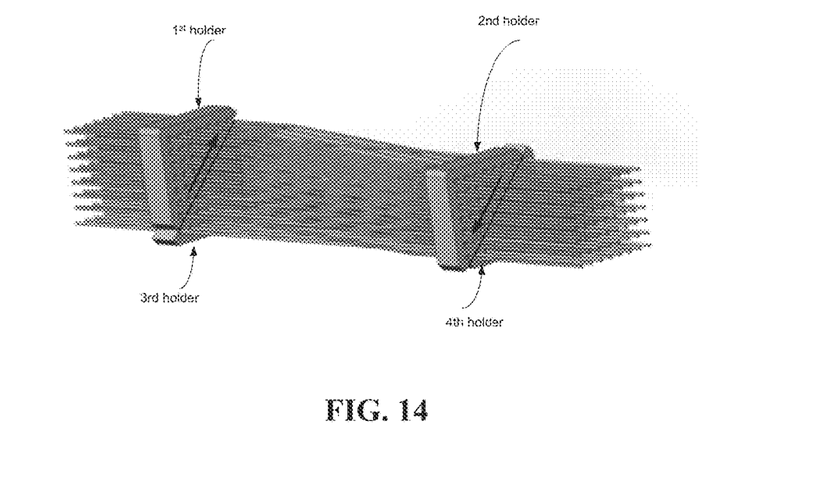
FIG. 14 is a schematic representation of a cable.

FIG. 14 illustrates the cable that includes the triangular holders shown in FIG. 12.

Elements of different embodiments disclosed herein may be combined unless they are mutually exclusive. Numerous modifications and variations of the present invention are possible in light of the above teachings. It is therefore to be understood that within the scope of the appended claims, the invention may be practiced otherwise than as specifically described herein.

I claim:

1. A regroup cable having first and second cable ends and comprising: a support structure disposed between the first and second cable ends, and a plurality of N(N−1) fibers supported by the support structure in fixed relative positions, wherein the plurality of fibers form N rows comprising (N−1) fibers in each row at the first cable end, and form N columns comprising (N−1) fibers in each column at the second cable end, wherein the plurality of fibers are arranged so as to comprise first and second bundles of fibers, wherein the first bundle is proximate to the second bundle so that no other fiber from the plurality of N(N−1) fibers is disposed between the first and second bundles, wherein a relative position of an end of the first bundle with respect to an end of the second bundle at the first cable end is different from a relative position of an end of the first bundle with respect to an end of the second bundle at the second cable end, wherein each of the N columns at the second cable end receives fibers extending from N−1 rows of fibers at the first cable end, and wherein for any two of the N columns there is a particular row at the first cable end such that one column receives a fiber from said row and another column receives no fibers from said row.

2. The regroup cable as defined in claim 1, wherein the support structure comprises a first support and a second support spaced apart from the first support, wherein the second support is disposed between the first support and the second cable end, wherein the first support supports the plurality of N(N−1) fibers arranged in the N rows with (N−1) fibers in each row, and wherein the second support supports the plurality of N(N−1) fibers arranged in the N columns with (N−1) fibers in each column.

3. The regroup cable as defined in claim 2, wherein fibers of the first bundle are parallel to each other, fibers of the second bundle are parallel to each other and not parallel to the fibers of the first bundle.

4. The regroup cable as defined in claim 3, wherein the first support comprises two holders and the second support comprises two holders, and wherein the first bundle of fibers extends from one of the two holders of the first support to one of the two holders of the second support, the second bundle of fibers extends from another of the two holders of the first support to another of the two holders of the second support, and wherein each bundle has a triangular arrangement of fibers in a cross section.

5. The regroup cable as defined in claim 4, wherein the triangular arrangement of fibers in the first bundle form a first triangle of fiber positions at the first cable end and a second triangle of fiber positions at the second cable end, wherein the triangular arrangement of fibers in the second bundle form a third triangle of fiber positions at the first cable end and a fourth triangle of fiber positions at the second cable end, wherein the first bundle is proximate to the second bundle so that a neighboring side of the first triangle is proximate to a neighboring side of the third triangle, and a neighboring side of the second triangle is proximate to a neighboring side of the forth triangle, and wherein a position of the neighboring side of the first triangle relative to the neighboring side of the third triangle is different from a position of the neighboring side of the second triangle relative to the neighboring side of the fourth triangle.

6. A regroup cable having a first end and a second end and comprising: a first support and a second support spaced apart from the first support, wherein the second support is disposed between the first support and the second end of the cable, a plurality of fibers supported by the first and second supports in fixed relative positions, wherein the plurality of fibers form N rows in the first support, wherein each of the N rows comprises (N−1) positions of fibers extending from said row, wherein the plurality of fibers form N columns in the second support, wherein each of the N columns comprises (N−1) positions of fibers extending to each of the N columns, wherein relative positions of each of the plurality of fibers are fixed within each of the first and second supports; wherein each intermediate row (i=2, . . . N−2) in an (N−1)×N matrix associated with the second support is associated with positions of one or more fibers extending to the second support from a corresponding row (i) of the first support and one or more fibers extending to the second support from a previous row (i−1) or a next row (i+1) of the first support, wherein the (N−1)×N matrix is such that the N columns formed by fiber positions in the second support are one-to-one associated with N columns of the (N−1)×N matrix, fibers extending from a top row of the first support extend to positions associated with a 1st row of the (N−1)×N matrix and fibers extending from a bottom row of the first support extend to positions associated with an (N−1)-th row in the (N−1)×N matrix; and, wherein each of the N columns in the second support receives fibers extending from N−1 rows of the first support, and wherein for any two of the N columns there is a particular row in the first support such that one column receives a fiber from said row and another column receives no fibers from said row.

7. The regroup cable as defined in claim 6, wherein each of the plurality of fibers, when extending between the first support and the second support, shifts laterally no more than to an adjacent row and an adjacent position within a row with respect to the N×(N−1) matrix associated with the first support and the (N−1)×N matrix associated with the second support.

8. The regroup cable as defined in claim 6, wherein the plurality of fibers form a first triangle of fiber positions at the first support and a second triangle of fiber positions at the second support, wherein the plurality of fibers form a third triangle of fiber positions at the first support and a fourth triangle of fiber positions at the second support, wherein a side of the first triangle is proximate to a side of the third triangle, and a side of the second triangle is proximate to a side of the forth triangle, and wherein a position of the side of the first triangle relative to the side of the third triangle is different from a position of the side of the second triangle relative to the side of the fourth triangle.

9. The regroup cable as defined in claim 7, wherein each row (i=1, . . . N−1) of the (N−1)×N matrix associated with the second support receives (N−1−i) fibers from the corresponding row (i) of the first support and i fibers from the next row (i+1) of the first support.

10. The regroup cable as defined in claim 9, wherein the first support is formed of two sections and the second support is formed of two sections, and wherein each of the two sections forming the first support and the two sections forming the second support has a triangular arrangement of fibers.

* * * * *